W. W. SNOW.
Car Wheel.

No. 1,150, / 32,154.

Patented Apr. 23, 1861.

Witnesses:
E. Cohen
J. Hirsh

Inventor:
William W. Snow
By atty A B Stoughton

UNITED STATES PATENT OFFICE.

WM. W. SNOW, OF JERSEY CITY, NEW JERSEY.

TIRE FOR LOCOMOTIVE-WHEELS.

Specification of Letters Patent No. 32,154, dated April 23, 1861.

*To all whom it may concern:*

Be it known that I, WILLIAM W. SNOW, of Jersey City, in the county of Hudson and State of New Jersey, have invented certain new and useful Improvements in Tires for the Driving-Wheels of Locomotives; and I do hereby declare the following to be a full, clear, and exact description of the construction of the same, reference being had to the accompanying drawings, making a part of this specification, in which—

Figure 1:
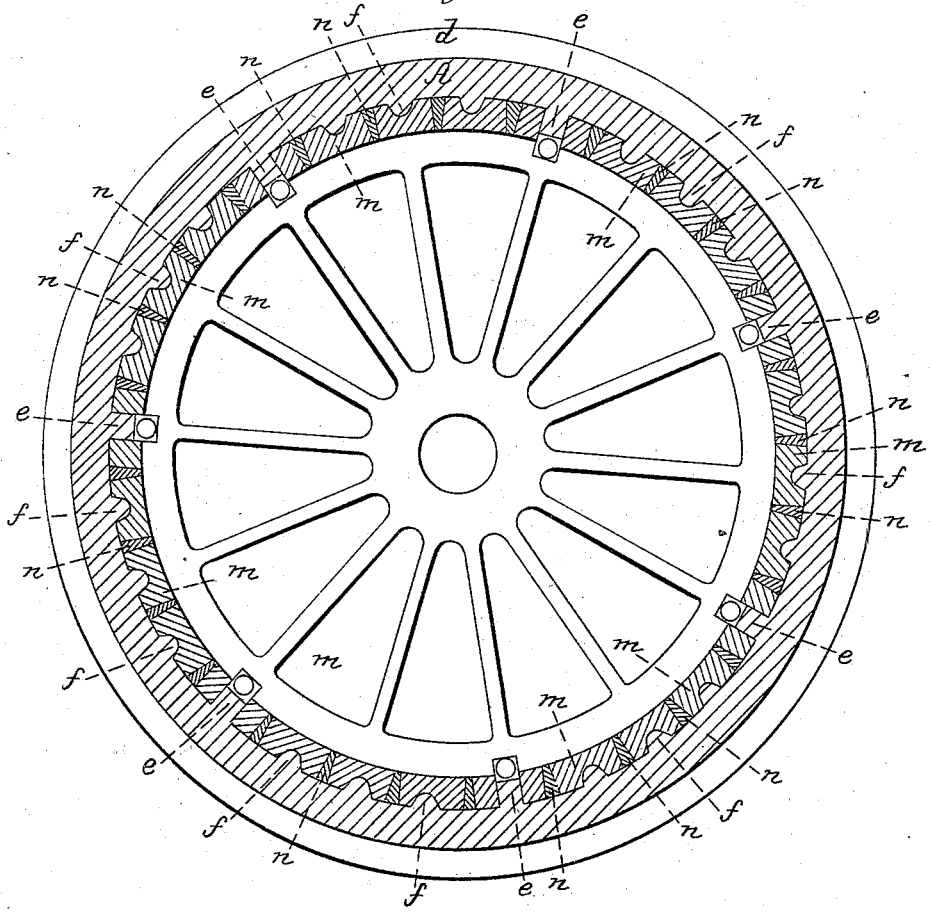
Figure 2:
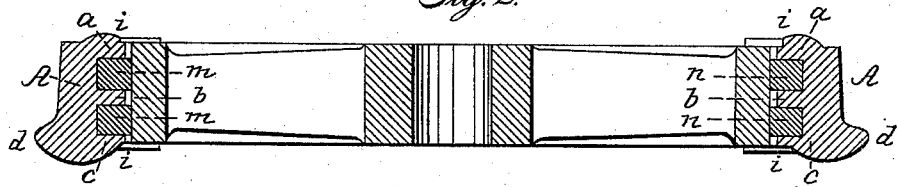

Figure 1. represents a vertical section through one of the tires, in a plane parallel to its face, and, Fig. 2. represents a cross section through the same.

Wrought iron tires are very expensive; and cast iron tires as heretofore made are very unreliable, inasmuch as if made heavy enough to withstand the strain upon them, there is a difficulty in getting a proper chill on the tread, and if made light enough to properly chill, they will give way under the heavy work they are designed to endure.

The object of my invention is to avail myself of lightness and strength in a cast iron tire, and to make provision for removing the evil that heretofore rendered light tires impracticable, or for resisting it to such a degree, as to render the strain heretofore encountered, nugatory.

The nature of my invention consists in making a hollow or cored cast iron tire, with flanges, braces, and brackets, that both give it strength, and afford means for securely fastening therein blocks of wood, to form a cushion between the tire and the wheel or center, as well as form a support for the bolts by which the tire is secured to said wheel or center.

I would here state that, I am aware that wood has heretofore been interposed between a rim and the center of a car wheel, to take off the blow or jar that the wheel receives in rolling over the rails. I make no claim to the so introducing of wood into car wheels, or driving wheels of locomotives, but only to the shape and form of the tire, so that it will be light, strong, easily chilled, and afford a good support for the blocks of wood, as well as for the bolts that hold the tire to the wheel or center and not be subject to the cracking and fracture incident to this kind of tire.

To enable others skilled in the art to make and use my invention, I will proceed to describe the same with reference to the drawings.

The tire A, may have the form shown in Fig. 2, viz: three interior flanges *a*, *b*, *c*, that form recesses between them, and the ordinary outside flange *d*, that margins the tread of the wheel. There also extends across the interior face of the tire, braces *e*, and brackets *f*, for the double purpose of strengthening the tread of the wheel, and preventing it from splitting or cracking, and for affording a bearing and support for the bolts (as shown in red in the figures) to pass through. On each face of the tire, in line with the braces there are recesses *i*—on one side to receive the head of the bolt, and on the other side the nut that holds it. There may be any suitable number of these braces, and bolts, varying in number, as the required strength or size of the tire may vary; and intermediately between these braces *e*, are the brackets *f* which, as well as the braces should be truly and evenly spaced, so that the blocks of wood that are to fit in or against them may be previously prepared by pattern or otherwise to snugly fit therein.

The blocks *m*, with the grain of the wood in the line of the strain, or radial, are driven in tightly between the wedge shaped pieces *n*, until the hollow or cored out recesses between the flanges are filled, the wood projecting say a sixteenth of an inch more or less from the inside face of the tire, when turned off true and smooth, and the tire is then fitted to the wheel or center (shown in red) and bolts passed through resting against the braces *e*, and against the wheel or center, in recesses, as also shown in red lines. The wood thus interposed and held between the wheel or center and the tire, cannot spread or get out of place, and serves as a cushion to receive all the blows and sudden jars or shocks that the driving wheels are subject to, and thus prevent the tires from cracking or giving way.

I recommend the use of the three flanges *a*, *b*, *c*, but in smaller or lighter wheels the two outside ones alone may be used. The advantage of the center flange *b*, is however obvious, as it comes more immediately in the center of the tread of the wheels, and gives them greater strength at that point.

Having thus fully described my invention what I claim therein as new is—

A hollow or cored out cast iron tire for the driving wheels of locomotives, when furnished with flanges, braces, and brackets, and filled in with wooden blocks, or their equivalents, in the manner, and for the purposes, herein set forth.

WM. W. SNOW.

Witnesses:
   D. BEDFORD,
   B. McANALLY.